United States Patent [19]

Schirmer

[11] Patent Number: 4,792,488
[45] Date of Patent: Dec. 20, 1988

[54] HIGH OXYGEN BARRIER COEXTRUDED FILM

[75] Inventor: Henry G. Schirmer, Spartanburg, S.C.

[73] Assignee: W. R. Grace & Co., Duncan, S.C.

[21] Appl. No.: 136,175

[22] Filed: Dec. 18, 1987

Related U.S. Application Data

[62] Division of Ser. No. 786,930, Oct. 11, 1985.

[51] Int. Cl.$^4$ .............................................. B32B 27/00
[52] U.S. Cl. .................................. 428/349; 428/516; 428/518; 428/520
[58] Field of Search ................ 428/349, 518, 516, 520

[56] References Cited

U.S. PATENT DOCUMENTS

| | | | |
|---|---|---|---|
| 3,558,330 | 1/1971 | Widiger et al. | 99/174 |
| 4,064,296 | 12/1977 | Bornstein et al. | 428/35 |
| 4,178,401 | 12/1979 | Weinberg et al. | 428/35 |
| 4,182,457 | 1/1980 | Yamada et al. | 215/1 |
| 4,244,914 | 1/1981 | Ranalli et al. | 264/515 |
| 4,405,667 | 9/1983 | Christensen | 428/35 |
| 4,409,364 | 10/1983 | Schmukler et al. | 525/74 |
| 4,501,798 | 2/1985 | Koschak et al. | 428/349 |
| 4,576,988 | 3/1986 | Tanaka et al. | 524/503 |
| 4,684,573 | 8/1987 | Mueller et al. | 428/349 |

FOREIGN PATENT DOCUMENTS

| | | |
|---|---|---|
| 009287 | 2/1983 | European Pat. Off. |
| 2014476 | 8/1979 | United Kingdom. |
| 1591424 | 6/1981 | United Kingdom. |
| 2106471 | 4/1983 | United Kingdom. |
| 2121062 | 5/1984 | United Kingdom. |

Primary Examiner—Edith Buffalow
Attorney, Agent, or Firm—John J. Toney; William D. Lee, Jr.; Mark B. Quatt

[57] ABSTRACT

A coextruded multilayer film includes a layer of a vinylidene chloride copolymer, and a layer of ethylene vinyl alcohol copolymer. The coextruded film has high oxygen barrier properties under both high and low humidity conditions.

20 Claims, 1 Drawing Sheet

HIGH OXYGEN BARRIER COEXTRUDED FILM

This is a divisional application of application Ser. No. 786,930, filed on Oct. 11, 1985.

BACKGROUND OF THE INVENTION

This invention relates to thermoplastic film, and particularly a thermoplastic film which provides a high oxygen barrier. More particularly, this invention relates to a thermoplastic coextruded film which provides a high oxygen barrier.

It is well known that ethylene vinyl alcohol copolymer (EVOH) may act as an oxygen barrier in multi-layer films. It is also recognized that vinylidene chloride copolymers, commonly known as saran, may also exhibit oxygen barrier characteristics in a multi-layer film. However, the characteristics of these barrier materials are such that their effectiveness as oxygen barriers is affected by the humidity of the environment in which the film is used, i.e., the barrier properties of these barrier materials are humidity sensitive.

The article *Ethylene Vinyl Alcohol Resins for Gas-Barrier Material* by T. Iwanami and Y. Hirai discusses the humidity dependence of ethylene vinyl alcohol in estimating its gas-barrier properties. Ethylene vinyl alcohol has good gas-barrier properties, including oxygen barrier properties in low-humidity conditions, but these properties degrade at high humidity.

On the other hand, saran typically exhibits better oxygen barrier properties at high humidity conditions than at low humidity conditions.

It would therefore be beneficial to provide a film which is relatively insensitive to humidity variations in providing high oxygen barrier properties.

It would be beneficial to provide such a film in which the film may be coextruded with the barrier materials. A problem to be overcome in the coextrusion of both saran and ethylene vinyl alcohol copolymer in a single coextruded film is the widely dissimilar extrusion temperatures of these respective materials. Saran has a typical extrusion temperature of about 320° F., in contrast to ethylene vinyl alcohol copolymer with an extrusion temperature of typically about 450° F. Nevertheless, if these materials can be coextruded together in a single coextruded film the resulting film would benefit not only from the combination of oxygen barrier materials having different humidity-related barrier characteristics, but the advantages of producing such a film in a coextrusion process with its attendant economies of production.

Of interest is U. K. patent application No. GB 2 014 476 A (Kuga et al) which discloses a substrate of polyvinyl alcohol coated on one or both sides with an aqueous dispersion of vinylidene chloride vinyl chloride copolymer.

It is an object of the present invention to provide a thermoplastic film in which high oxygen barrier characteristics are obtained.

It is another object of the invention to provide a thermoplastic film in which high oxygen barrier characteristics are obtained over a wide range of humidity conditions.

It is a still further object of the present invention to provide a thermoplastic coextruded film in which high oxygen barrier characteristics are obtained.

It is yet another object of the present invention to provide a thermoplastic coextruded film in which high oxygen barrier characteristics are obtained over a wide range of humidity conditions.

DEFINITIONS

The terms "acid- or acid anhydride-modified polymeric materials" and the like, as used herein, refer to materials suitable for use as adhesives and which preferably include a graft copolymer of polyolefin, such as polyethylene, or ethylene-ester copolymer substrate and an unsaturated carboxylic acid or acid anhydride, blended with a polyolefin, such as polyethylene, or ethylene-ester copolymer.

The term "ethylene vinyl acetate copolymer" as used herein refers to a copolymer formed from ethylene and vinyl acetate monomers wherein the ethylene derived units in the copolymer are present in major amounts, generally from about 60% to 98% by weight, and the vinyl acetate derived units in the copolymer are present in minor amounts, generally from about 2% to 40% by weight.

The terms "vinylidene chloride copolymer", "saran", and the like refer to a comonomer of vinylidene chloride polymerized with other unsaturated compounds such as various acrylates, nitriles, and vinyl chloride.

The terms "ethylene vinyl alcohol copolymer" and the like refer to saponified or hydrolyzed ethylene vinyl acetate copolymer.

SUMMARY OF THE INVENTION

In accordance with the present invention, there is provided a coextruded multi-layer thermoplastic film comprising a layer comprising vinylidene chloride copolymer, and a layer coextruded with the vinylidene chloride copolymer layer and comprising ethylene vinyl alcohol copolymer.

A preferred embodiment includes a first layer comprising a copolymer of ethylene; a second layer comprising a copolymer of ethylene; a third or barrier layer comprising vinylidene chloride copolymer; a fourth layer comprising an acid- or acid anhydride-modified polymeric material; a fifth or barrier layer comprising ethylene vinyl alcohol copolymer; a sixth layer comprising an acid- or acid anhydride-modified polymeric material, and a seventh layer comprising a copolymer of ethylene.

BRIEF DESCRIPTION OF THE DRAWINGS

Further details are given below with reference to the drawings wherein.

DESCRIPTION OF THE PREFERRED EMBODIMENTS

Figure 1:
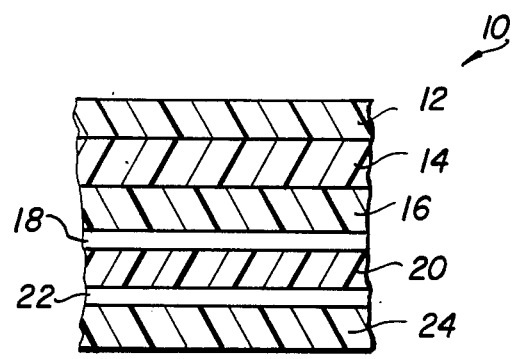
FIG. 1 is a schematic cross section of a coextruded film of the invention.

Referring to FIG. 1, a schematic cross-section of the coextruded film 10 of the invention is shown.

First layer 12 of FIG. 1 is preferably an ethylene vinyl acetate copolymer (EVA), more preferably an EVA with a vinyl acetate content of between about 2% and 8% by weight, and even more preferably an EVA with a vinyl acetate content of between about 2% and 5% vinyl acetate content by weight. A commercial example of an EVA suitable for first layer 12 is Exxon 32.89 EVA, with a vinyl acetate content of about 4.5% by weight. The use of EVA in first layer 12 of FIG. 1 is especially advantageous in obtaining a softer film with lower sealing temperatures. Nevertheless, other polymeric materials may also be suitable for first layer 12, including polyolefins such as polyethylene. Polypropylene is particularly suitable for use in connection with autoclavable films where higher seal strengths are needed.

The second layer 14 is also preferably an EVA, more preferably an EVA with a vinyl acetate content of between about 10% and 30%, by weight, and even more preferably an EVA with a vinyl acetate content of between about 17% and 18% by weight, such as Alathon 3170 available from DuPont.

The third or barrier layer 16 is a copolymer of vinylidene chloride, such as vinylidene chloride vinyl chloride copolymer (commonly known as saran). A suitable commercial resin is PV 864 available from Solvay.

The fourth layer 18 is an acid or acid anhydride-modified polymeric material which can bond the third or barrier layer 16 to the fifth or barrier layer 20 comprising ethylene vinyl alcohol copolymer. Several commercial adhesives are available for fourth layer 18, including CXA-162 available from DuPont. The sixth layer 22 is preferably similar to fourth layer 18.

The fifth or barrier layer 20 comprises EVOH, such as EVAL-EC-F101 available from EVAL Co. of America.

Seventh layer 24 is preferably ethylene vinyl acetate copolymer, and more preferably an EVA with a relatively high vinyl acetate content, about 20–40% vinyl acetate by weight. A suitable EVA is Elvax 250 available from DuPont, with a vinyl acetate content of about 28% by weight. The relatively high vinyl acetate EVA used in the seventh layer 24 facilitates internal welding in embodiments where the tubular coextruded film is adhered to a double lay-flat configuration after passing through nip rolls. Such a "double wound" film would in the case of the preferred embodiment result in the EVA with relatively high vinyl acetate percent adhered to a like layer on the inside surface of the tubular film.

Figure 2:
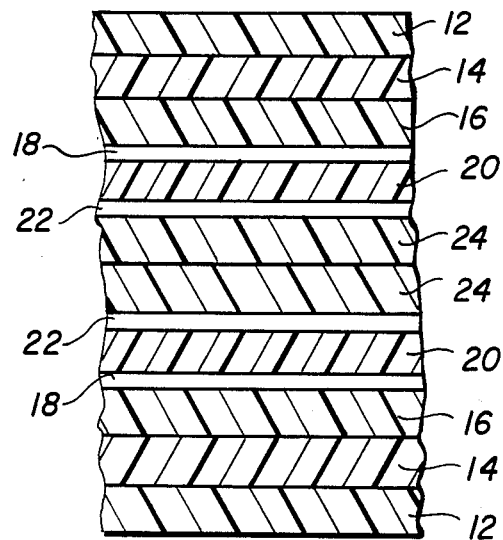
FIG. 2 is a schematic cross section of an alternate embodiment of a coextruded film of the invention.

Such a double wound film is depicted in FIG. 2 in schematic fashion. Coextruded film 10 of FIG. 1 is extruded as a tubular film, and subsequently passed through nip rolls or other suitable gathering means to press adjacent film surfaces 24 together. This double wound film structure in accordance with the present invention has the advantage of providing four separate barrier layers, two of which comprises a vinylidene chloride copolymer and two of which comprise ethylene vinyl alcohol copolymer in a single structure produced by coextrusion of a tubular film.

Seventh layer 24 may also comprise polyolefins, including polyethylene and polypropylene.

The advantages of providing a coextruded tubular film in accordance with the present invention are further deomonstrated by reference to the examples provided below of physical properties determined from sample films.

EXAMPLE 1

A film was prepared which had the following structure: EVA (EXXON 32.89)/EVA (Alathon 3170)/Saran (PV 864)/CXA-162/EVOH (EVAL EC-F101)/CXA-162/EVA (ELVAX 250).

Three samples had an average thickness of 2.23 mils (double wound), i.e. a singlewall thickness of 1.12 mils thick. The third or barrier layers of saran of the double wound film together averaged 0.23 mils thick; the fifth or barrier layers of EVOH of the double wound film together averaged 0.14 mils thick.

The film was coextruded with the use of a thermally insulated saran section of a coextrusion die. An insulating agent was used to insulate the saran (extrusion temperature of 320° F.) from higher surrounding temperatures of the die. The ethylene vinyl alcohol copolymer and saran were simultaneously coextruded through the coxtrusion die, and were formed into an annular shape at substantially the same time. The saran is thus formed into an annular shape at about 300° F. instead of about 400° F. (EVOH has an extrusion temperature of about 450° F.). Thus, the saran only encounters the 400° F. melt temperature for a brief period of time after contact with the adjacent melt. The film was then passed through conventional cooling means and gathered on a take-up roll.

Oxygen transmission at 73° F., 0% relative humidity was 1.3 ccstp/(24 hours, square meter, atmosphere). Oxygen transmission at 73° F., 100% relative humidity was 22.6 ccstp/(24 hours, square meter, atmosphere).

EXAMPLE 2

A film similar to the composition of example 1, but with an overall average thickness (three samples) of 1.88 mils (double wound), i.e. a single wall thickness of 0.94 mils, was coextruded into a tubular film. The average total thickness of the saran layers was 0.26 mils; the EVOH averaged 0.16 mils.

Oxygen transmission at 73° F., 0% relative humidity was 1.7 ccstp/(24 hours, square meter, atmosphere). Oxygen transmission at 73° F., 100% relative humidity was 1.7 ccstp/(24 hours, square meter, atmosphere).

EXAMPLE 3

A film with a composition similar to examples 1 and 2 above was made, with an overall total thickness of 2.11 mils (double wound), i.e, a single wall thickness of 1.05 mils. The total saran thickness averaged 0.38 mils (three samples); the total EVOH thickness averaged 0.29 mils.

Oxygen transmission at 73° F., 0% relative humidity was 1.4 ccstp/(24 hours, square meter, atmosphere). At 100% relative humidity, the oxygen transmission was 0.2 ccstp/(24 hours, square meter, atmosphere).

The test methodology of ASTM D 3985 is followed for determining oxygen transmission rates at 73° F., 0% relative humidity. At 100% relative humidity, the "sandwich" method discussed in *ASTM Journal of Testing and Evaluation,* volume 12, number 3, May 1984, at pages 149–151 was utilized. Testing is performed on OX-TRAN oxygen permeability testing equipment. Thicknesses of the saran and EVOH layers were measured optically.

Coextruded films made in accordance with the present invention are suitable for example in making shelf stable food packages, and particularly have a potential use in long term storage for food products.

Although the present invention has been described in connection with the preferred embodiments, it is to be understood that various changes and modifications may be made without departing from the principles and scope of the invention, as those skilled in the art will readily understand. Such changes and modifications may be practiced within the scope of the following claims.

What is claimed is:

1. A coextruded multi-layer thermoplastic film comprising:
   (a) a layer comprising vinylidene chloride copolymer;
   (b) a layer comprising ethylene vinyl alcohol copolymer;
   (c) an intermediate layer disposed between said vinylidene chloride copolymer and ethylene vinyl alcohol copolymer layers and comprising an adhesive polymeric material;
   (d) fourth and fifth layers disposed on the respective surfaces of the vinylidene chloride copolymer and ethylene vinyl alcohol copolymer layers opposite said intermediate layer, either of said fourth and fifth layers comprising an adhesive polymeric material, and the other of said fourth or fifth layers comprising a copolymer of ethylene; and
   (e) sixth and seventh layers disposed on the outside of said fourth and fifth layers, said sixth and seventh layers selected from the group consisting of polyolefins and copolymers of ethylene.

2. The film according to claim 1 wherein the vinylidene chloride copolymer comprises vinylidene chloride vinyl chloride copolymer.

3. The film according to claim 1 wherein the intermediate layer, and either of the fourth and fifth layers comprises an acid- or acid anhydride-modified polymeric material.

4. The film according to claim 3 wherein the acid- or acid anhydride-modified polymeric material comprises an acid- or acid anhydride-modified ethylene vinyl acetate copolymer.

5. The film according to claim 1 wherein the copolymer of ethylene comprises an ethylene vinyl acetate copolymer.

6. A coextruded multi-layer thermoplastic film comprising
   (a) a first layer comprising a copolymer of ethylene;
   (b) a second layer comprising a copolymer of ethylene;
   (c) a third or barrier layer comprising vinylidene chloride copolymer;
   (d) a fourth layer comprising an adhesive polymeric material;
   (e) a fifth or barrier layer comprising ethylene vinyl alcohol copolymer;
   (f) a sixth layer comprising an adhesive polymeric material; and
   (g) a seventh layer comprising a copolymer of ethylene.

7. The film according to claim 6 wherein the first layer comprises ethylene vinyl acetate copolymer.

8. The film according to claim 7 wherein the first layer of ethylene vinyl acetate has a vinyl acetate content of between about 2% and 8% by weight.

9. The film according to claim 7 wherein the first layer of ethylene vinyl acetate copolymer has a vinyl acetate content of between about 2% and 5% by weight.

10. The film according to claim 7 wherein the ethylene vinyl acetate copolymer has a vinyl acetate content of about 4.5% by weight.

11. The film according to claim 6 wherein the second layer comprises ethylene vinyl acetate copolymer.

12. The film according to claim 11 wherein the ethylene vinyl acetate copolymer has a vinyl acetate content of between about 10% and about 30% by weight.

13. The film according to claim 11 wherein the ethylene vinyl acetate copolymer has a vinyl acetate content of between about 17% and 18% by weight.

14. The film according to claim 6 wherein the third or barrier layer comprises vinylidene chloride vinyl chloride copolymer.

15. The film according to claim 6 wherein the fourth and sixth layers comprise an acid- or acid anhydride-modified polymeric material.

16. The film according to claim 15 wherein the acid- or acid anhydride-modified polymeric material comprises an acid- or acid anhydride-modified ethylene vinyl acetate copolymer.

17. The film according to claim 6 wherein the seventh layer comprises ethylene vinyl acetate copolymer.

18. The film according to claim 17 wherein the ethylene vinyl acetate copolymer has a vinyl acetate content of between about 20% and 40% by weight.

19. The film according to claim 17 wherein the ethylene vinyl acetate copolymer has a vinyl acetate content of about 28% by weight.

20. The film according to claim 6 wherein said film is a lay-flat tubular film having its interior lay-flat surfaces welded together.

* * * * *